(12) United States Patent
Nimura et al.

(10) Patent No.: US 7,926,611 B2
(45) Date of Patent: Apr. 19, 2011

(54) SHAFT DRIVE DEVICE

(75) Inventors: Taisuke Nimura, Saitama (JP); Kenji Kofuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 12/042,471

(22) Filed: Mar. 5, 2008

(65) Prior Publication Data
US 2008/0234055 A1    Sep. 25, 2008

(30) Foreign Application Priority Data

Mar. 20, 2007 (JP) ................................. 2007-071931

(51) Int. Cl.
*B60K 17/00* (2006.01)
(52) U.S. Cl. ....................................................... 180/358
(58) Field of Classification Search .................. 180/358, 180/376, 226, 225, 227
See application file for complete search history.

(56) References Cited

U.S. PATENT DOCUMENTS

| 6,932,178 B2 * | 8/2005 | Soatti ............................ 180/226 |
| 7,533,751 B2 * | 5/2009 | Handa et al. .................. 180/210 |
| 7,644,797 B2 * | 1/2010 | Kofuji ............................ 180/227 |
| 2006/0065463 A1 * | 3/2006 | Handa et al. .................. 180/227 |
| 2009/0057046 A1 * | 3/2009 | Kofuji ............................ 180/226 |

FOREIGN PATENT DOCUMENTS

| DE | 2333040 A | 1/1975 |
| DE | 3811889 A1 | 10/1989 |
| EP | 1437253 A2 | 7/2004 |
| EP | 1642819 A1 | 4/2006 |
| GB | 1516217 | 6/1978 |
| JP | 1-37353 Y2 | 11/1989 |
| JP | 04151388 A * | 5/1992 |
| JP | 6-193642 A | 7/1994 |
| JP | 2003-118675 A | 4/2003 |

* cited by examiner

*Primary Examiner* — Faye M. Fleming
(74) *Attorney, Agent, or Firm* — Birch, Stewart, Kolasch & Birch, LLP (57) ABSTRACT

An easily connected universal joint for attaching to an output shaft of an engine. A drive shaft is connected to an output shaft of an engine which is mounted on a vehicle body by way of a universal joint with a wheel being connected to a distal end side of the drive shaft. Projection portions project outwardly from a yoke of the universal joint connected to the output shaft by splines. A swing arm rockably supported on the vehicle body using one shaft with the universal joint being arranged above the shaft. A boot mounted between a distal end of the swing arm and a peripheral portion of the output shaft.

20 Claims, 9 Drawing Sheets

SHAFT DRIVE DEVICE

CROSS-REFERENCE TO RELATED APPLICATIONS

The present application claims priority under 35 USC 119 to Japanese Patent Application No. 2007-071931 filed on Mar. 20, 2007 the entire contents of which are hereby incorporated by reference.

BACKGROUND OF THE INVENTION

1. Field of the Invention

The present invention relates to a shaft drive device and, more particularly to a technique which enhances an assembling property of a universal joint and a drive shaft to an output shaft of an engine. The present invention mainly relates to a shaft drive device which is favorably applicable to a motorcycle.

2. Description of Background Art

Conventionally, a shaft drive device is known that is capable of transmitting an output of an engine mounted on a vehicle body to a wheel by way of a drive shaft by connecting the drive shaft to an output shaft of the engine by way of a universal joint and by connecting the wheel to a distal end side of the drive shaft. See, for example, JP-UM-B-1-37353 and JP-A-2003-118675.

JP-UM-B-1-37353 (mainly FIG. 5) discloses a technique which, to facilitate a fitting engagement between a yoke joint (8) and a propeller shaft (6) at the time of reassembling, forms guide ribs (4d, 4e) which restrict the movement of the yoke joint (8) in the pull-out direction on an inner surface of a rear fork (4b) so as to maintain a spline fitting engagement between the yoke joint (8) and an output shaft (3a) of the engine when the propeller shaft (6) is pulled out from the rear fork (4b).

However, JP-UM-B-1-37353 does not disclose any technique which connects a yoke (8b) to an output shaft (3a) of an engine.

On the other hand, JP-A-2003-118675 (mainly FIG. 5 to FIG. 7) discloses a technique in which a universal joint (51) and a drive shaft (52) are connected with each other by fitting a male fitting portion (52a) formed on one end of the drive shaft (52) into a female fitting portion (74a) formed on an output-side yoke (74) extending from the universal joint (51). A length of the male fitting portion (52a) in the axial direction is set 1.5 to 3.0 times as large as a specific length L necessary for transmission of an output so as to produce a margin of movement of (0.5 to 2.0)×L. According to this technique, in connecting the universal joint (51) to the output shaft (48) of the engine, the universal joint (51) can be pulled out from a shaft storing portion (15) which houses the universal joint (51) and the drive shaft (52) therein and, while maintaining the connection of the universal joint (51) and the drive shaft (52), the universal joint (51) can be easily connected to the output shaft (48) of the engine.

The technique disclosed in the above-mentioned JP-A-2003-118675 cannot always easily connect the universal joint to the output shaft of the engine.

For example, when a working space provided for allowing an operator to grasp a yoke to be connected to an output shaft of an engine and to move the yoke to the output shaft side is narrow, both of a yoke grasping operation and a yoke moving operation become difficult. Thus, an operation for connecting the universal joint to the output shaft of the engine is not always easy.

Further, for example, when it is not desirable to slidably connect an output-side yoke of the universal joint and a drive shaft by spline fitting (for example, when a large output is to be transmitted), the technique disclosed in the above-mentioned JP-A-2003-118675 is not adoptable. Thus, the operation for connecting the universal joint to the output shaft of the engine becomes difficult.

SUMMARY AND OBJECTS OF THE INVENTION

It is an object of an embodiment of the present invention to provide a shaft drive device which can easily connect a universal joint to an output shaft of an engine even under the above-mentioned circumstances.

To achieve the above-mentioned object according to an embodiment of the present invention, a shaft drive device is capable of transmitting an output of an engine mounted on a vehicle body to a wheel by way of a drive shaft by connecting the drive shaft to an output shaft of the engine by way of a universal joint and by connecting the wheel to a distal end side of the drive shaft. A projecting portion which projects outwardly is formed on a yoke of the universal joint which is connected to the output shaft by a spline fitting.

Due to such a construction, by allowing an operator to firmly grasp the yoke by making use of the projecting portion which projects outwardly and, at the same time, to apply a force to the projecting portion, the operator can surely move the yoke in the direction of the output shaft of the engine.

In this manner, according to an embodiment of the present invention the operator can easily connect the universal joint to the output shaft of the engine and, at the same time, the operator can easily remove the universal joint from the output shaft of the engine.

According to an embodiment of the present invention, for example, even when an operation space provided for connecting the yoke to the output shaft of the engine is narrow or even when it is not desirable to slidably connect the output-side yoke of the universal joint and the drive shaft by spline fitting, the operator can easily connect the universal joint to the output shaft of the engine.

Further, to achieve the above-mentioned object according to an embodiment of the present invention, a shaft drive device includes an engine mounted on a vehicle body, a drive shaft which is connected to an output shaft of the engine by way of a universal joint. A wheel is provided which is mounted on a distal end of a swing arm which houses the drive shaft therein and is driven by way of the drive shaft. A boot is arranged between an end portion of the swing arm on an engine side and a peripheral portion of an output shaft in the engine and covers a yoke of the universal joint which is connected to the output shaft by spline fitting wherein a projecting portion which projects outwardly is formed on the yoke.

Due to such a construction, the intrusion of water into the shaft drive device can be prevented by the boot.

Further, in the shaft drive device which is configured such that the boot is arranged between the end portion of the swing arm on the engine side and the peripheral portion of the output shaft in the engine and the boot covers the yoke of the universal joint connected to the output shaft by spline fitting, in connecting the yoke to the output shaft of the engine, it is necessary to move the yoke to the output shaft side by grasping the yoke in a state wherein the boot is shrunken toward the swing arm side. According to an embodiment of the present invention, however, by making use of the projecting portion, an operator can connect the yoke to the output shaft while firmly grasping the yoke in a state that the boot is shrunken toward the swing arm side.

Further, to achieve the above-mentioned object according to an embodiment of the present invention, a shaft drive device includes an engine which is mounted on a vehicle body, a drive shaft is connected to an output shaft of the engine by way of a universal joint and a wheel is mounted on a distal end of a swing arm which houses the drive shaft therein and is driven by way of the drive shaft. The the swing arm is rockably supported on the vehicle body using one shaft. The universal joint is arranged above the shaft. A projecting portion, which projects outwardly, is formed on a yoke of the universal joint which is connected to the output shaft of the engine by spline fitting.

Due to such a construction, by supporting the swing arm on the vehicle body using one shaft (one penetration shaft), it is possible to enhance the supporting rigidity of the swing arm.

Further, in such a shaft drive device which is configured such that the swing arm which houses the drive shaft therein is supported on the vehicle body using one shaft, the support portion and the universal joint are made close to each other vertically. Thus, an operational space provided for grasping the yoke to be connected to the output shaft of the engine and for moving the yoke to the output shaft side becomes narrow. According to an embodiment of the present invention, however, by allowing an operator to firmly grasp the yoke by making use of the projecting portion and to apply a force to the projecting portion, the operator can easily connect the universal joint to the output shaft of the engine by surely moving the yoke in the direction toward the output shaft of the engine.

It is desirable to configure the shaft drive device such that a ring-shaped groove is formed in a distal end portion of the output shaft, a C-ring-shaped clip is mounted in the ring-shaped groove, and tapered portions which are engaged with or disengaged from the C-ring-shaped clip are respectively formed on a front end and a rear end of a spline portion of the yoke.

Due to such a constitution, by engaging the tapered portion formed on the rear end of the spline portion of the yoke connected to the output shaft with the C-ring-shaped clip, it is possible to prevent the removal of the yoke from the output shaft.

When such a construction is adopted, in connecting the yoke to the output shaft, it is necessary to move the yoke in the direction of the output shaft with a force approximately sufficient to push the C-ring-shaped clip into the ring-shaped groove at the tapered portion of the front portion of the spline. According to the present invention, however, by allowing an operator to firmly grasp the yoke by making use of the projecting portion and to apply a force to the projecting portion, the operator can easily connect the universal joint to the output shaft of the engine by surely moving the yoke in the direction of the output shaft of the engine.

It is desirable to configure the shaft drive device such that the driven-side yoke of the universal joint is integrally formed with the drive shaft.

Due to such a construction, it is no longer necessary to connect the driven-side yoke and the drive shaft by spline fitting, for example. Thus, it is possible to transmit a large force.

When such a construction is adopted, the technique disclosed in the above-mentioned JP-A-2003-118675 is not applicable. According to an embodiment of the present invention, however, by allowing an operator to firmly grasp the yoke by making use of the projecting portion and to apply a force to the projecting portion, the yoke can be surely moved in the direction of the output shaft of the engine. Thus, the operator can easily connect the universal joint and the drive shaft to the output shaft of the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is explained hereinafter in conjunction with the drawings.

Figure 1:
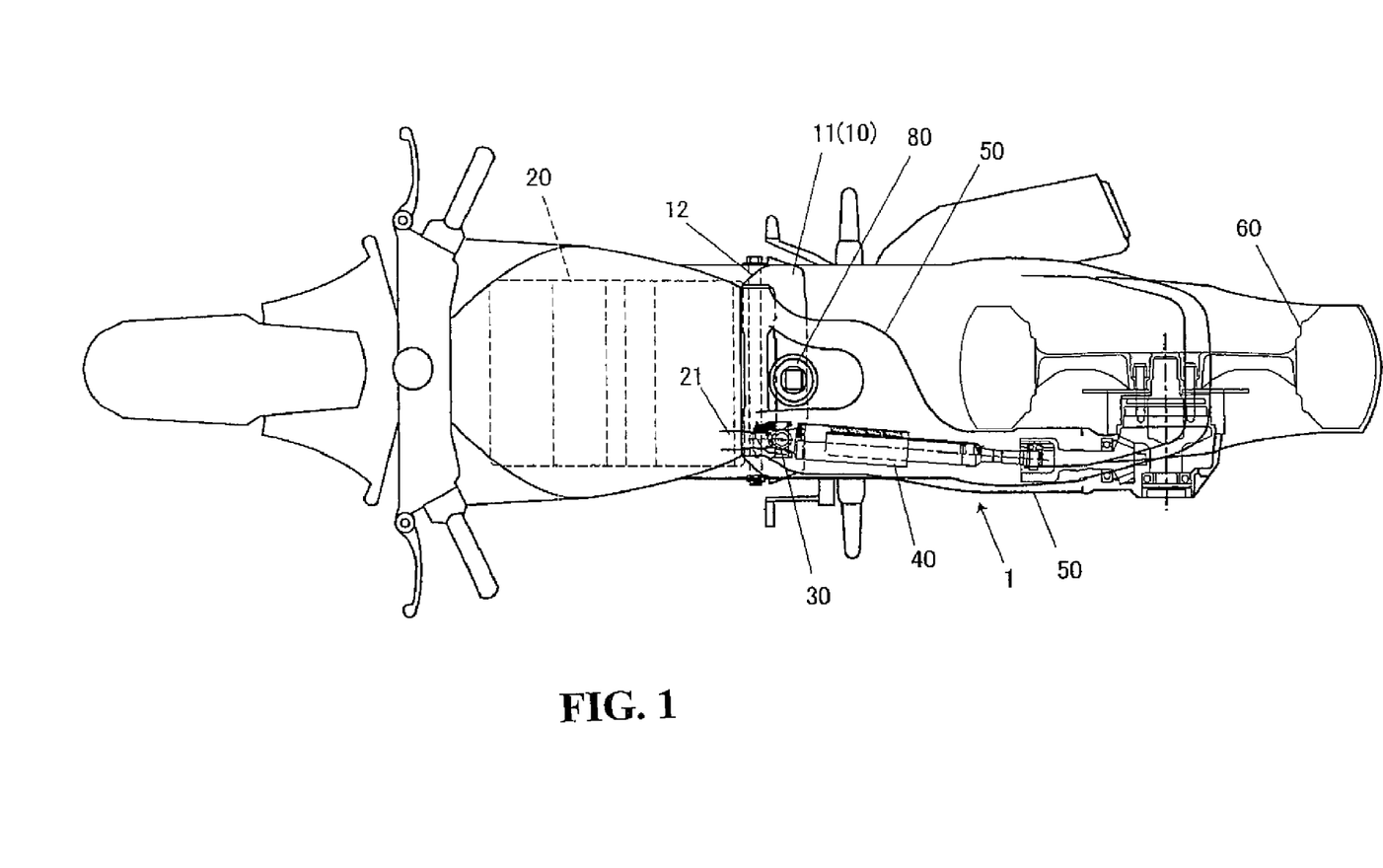
FIG. 1 is a schematic plan view showing one example of a motorcycle which uses one embodiment of a shaft drive device according to the present invention.
Figure 2:
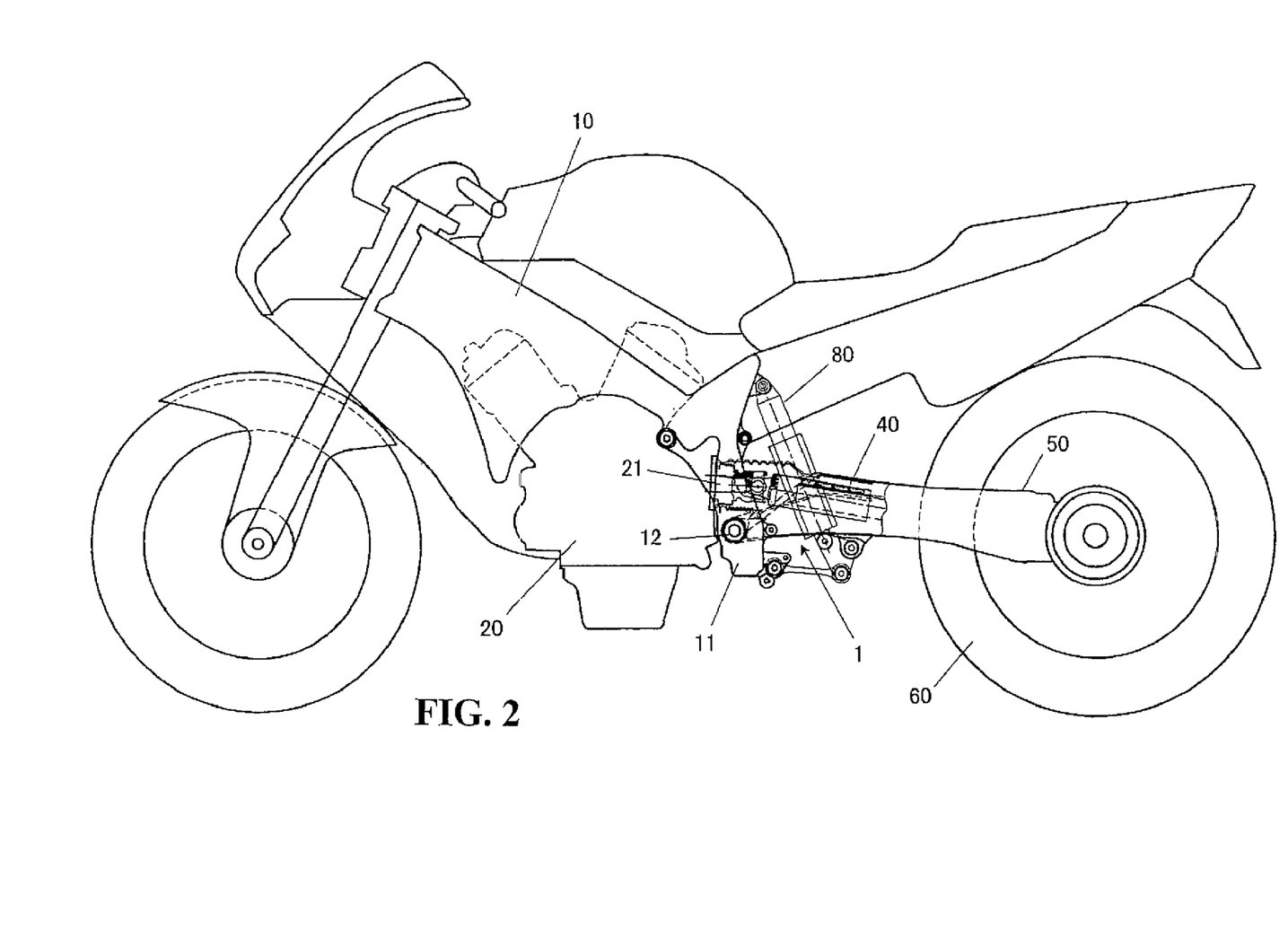
FIG. 2 is a schematic side view of the motorcycle.
Figure 3:
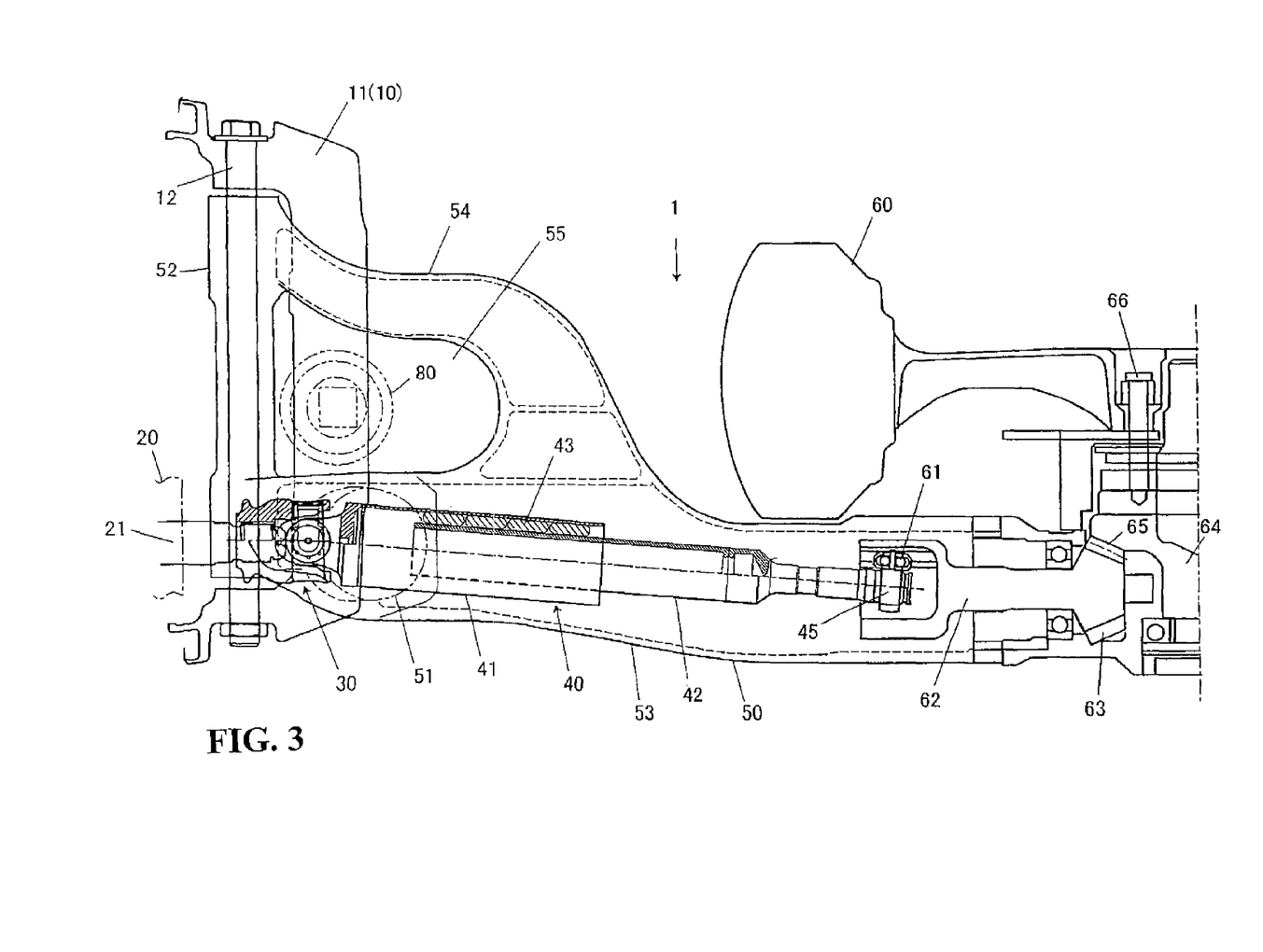
FIG. 3 is a plan view of the shaft drive device.
Figure 4:
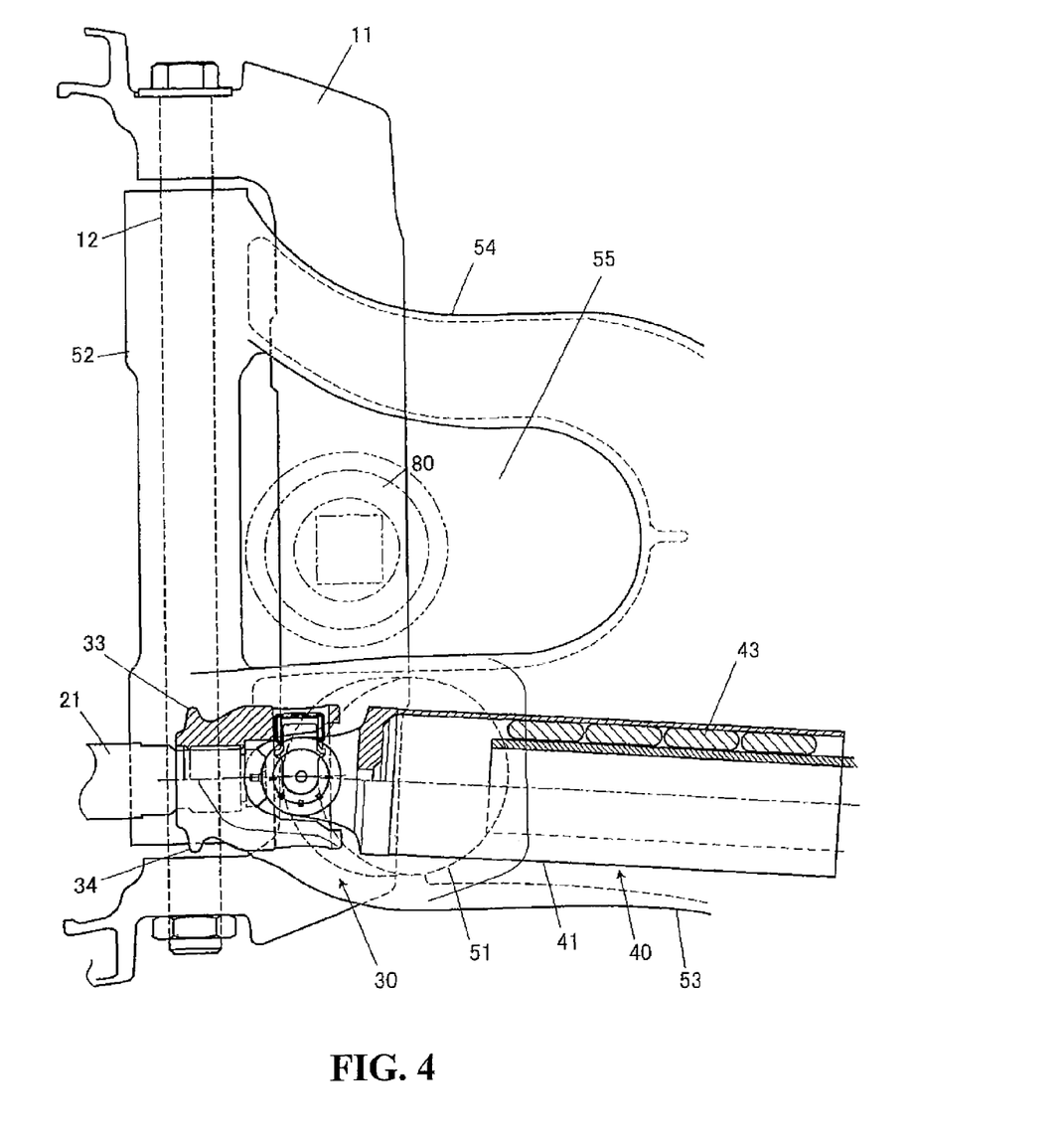
FIG. 4 is a plan view of an essential part of the shaft drive device.

As shown in FIGS. 1 to 3, the shaft drive device 1 includes an engine 20 which is mounted on a vehicle body 10, a drive shaft 40 to be connected to an output shaft 21 of the engine 20 by way of a universal joint 30, a wheel 60 which is mounted on a distal end of a swing arm 50 which houses the drive shaft 40 and is driven by way of the drive shaft 40, and a boot 70 which is arranged between an end portion 51 on an engine 20 side of the swing arm 50 (see FIG. 5) and a peripheral portion 20a of the output shaft 21 in the engine 20 and covers a yoke 31 of the universal joint 30 which is connected to the output shaft 21 by way of splines 22, 32. Projecting portions 33, 34 are formed on the yoke 31 in an outwardly projecting manner.

As shown in FIG. 3, the swing arm 50 is rockably supported on a main frame 11 of the vehicle body 10 with one shaft 12, and the rear wheel 60 is supported on a rear end of the swing arm 50 in a cantilever manner.

The swing arm 50 is integrally formed of a cylindrical front portion 52 which is supported by the shaft 12, a cylindrical main arm 53 which extends rearwardly from the front portion 52, and a sub arm 54 which supports the main arm 53 on the cylindrical front portion 52. The drive shaft 40 is housed in the main arm 53.

Figure 5:
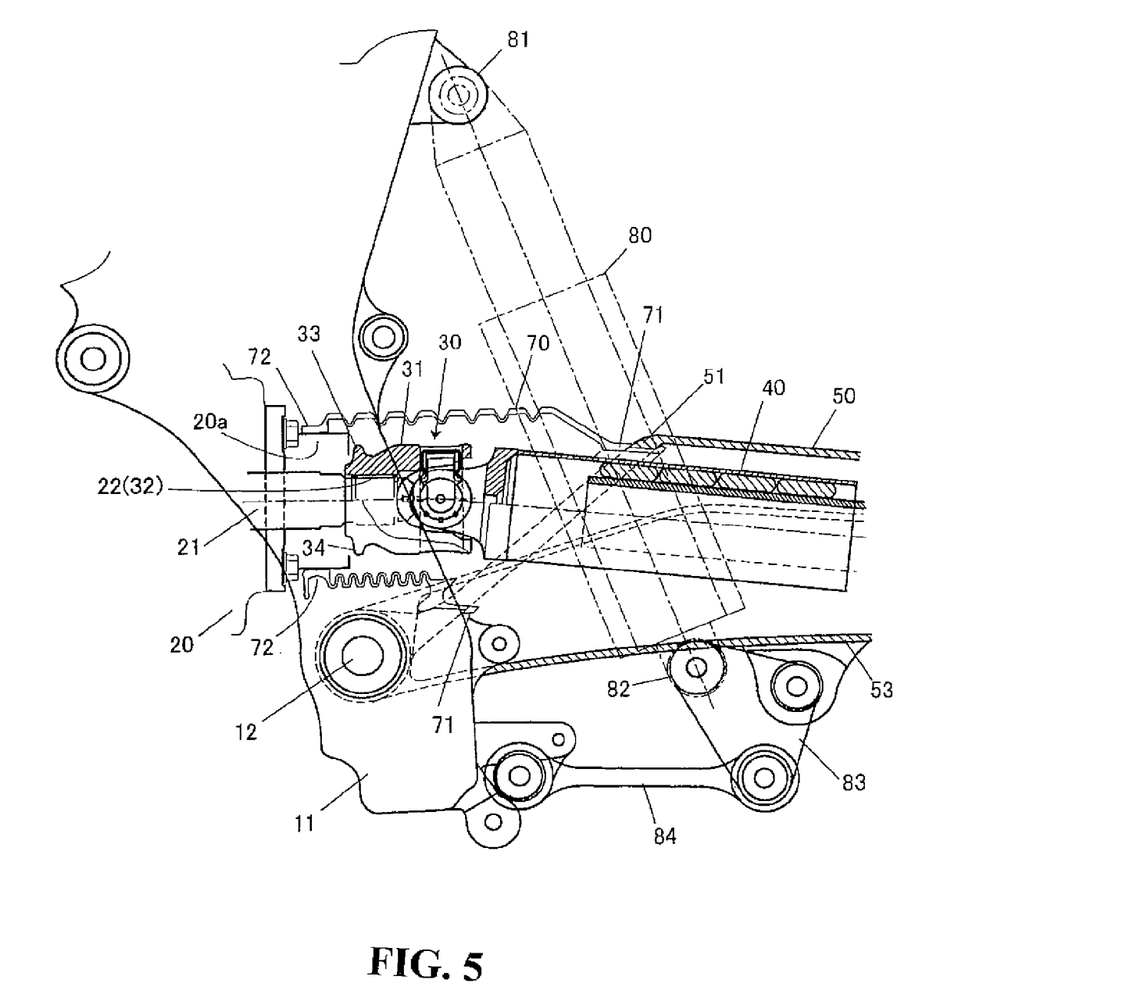
FIG. 5 is a side view of the essential part of the shaft drive device.

As shown in FIGS. 2 and 5, the above-mentioned universal joint 30 is arranged above the shaft 12.

As shown in FIGS. 1 and 3, a shock absorber unit 80 is arranged in a space 55 defined between the main arm 53 and the sub arm 54.

As shown in FIG. 5, an upper end 81 of the shock absorber unit 80 is connected to the main frame 11, and a lower end 82 of the shock absorber unit 80 is connected to the swing arm 50 by way of links 83, 84. Due to such a construction, the swing arm 50 is suspended from the shock absorber unit 80.

Figure 6A:
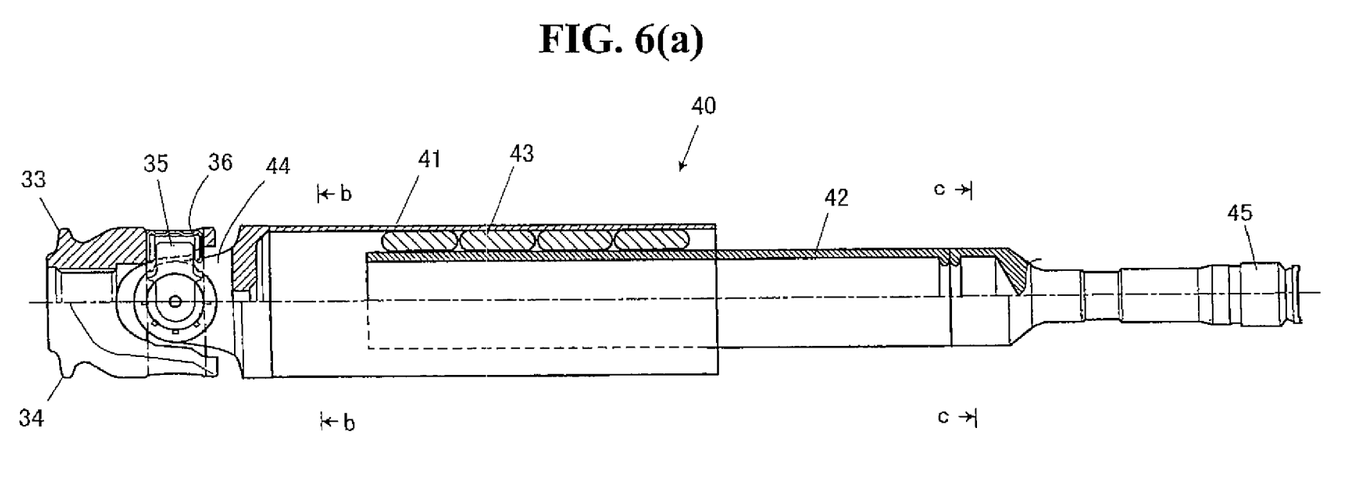
FIG. 6(a) is a plan view with a part broken away.
Figure 6B:
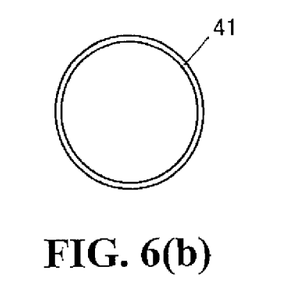
FIG. 6(b) is a cross-sectional view taken along a line b-b in FIG. 6(a)
Figure 6C:
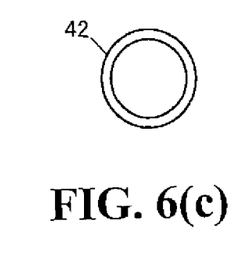
FIG. 6(c) is a cross-sectional view taken along a line c-c in FIG. 6(a)

FIGS. 6(a) to 6(c) are views showing the drive shaft 40, wherein FIG. 6(a) is a plan view of the drive shaft 40 with a part broken away, FIG. 6(b) is a cross-sectional view taken along a line b-b in FIG. 6(a), and FIG. 6(c) is a cross-sectional view taken along a line c-c in FIG. 6(a).

The drive shaft 40 includes a large cylindrical portion 41, a small cylindrical portion 42 and dampers 43 which connect the large cylindrical portion 41 and the small cylindrical portion 42. A front portion of the small cylindrical portion 42 is inserted into a rear side of the inside of the large cylindrical portion 41, and the rear side of the inside of the large cylindrical portion 41 and the front portion of the small cylindrical portion 42 are connected with each other by the dampers 43.

A driven-side yoke 44 which constitutes the universal joint 30 is integrally formed on a front portion of the large cylindrical portion 41, and the driven-side yoke 44 is connected to the above-mentioned yoke (drive-side yoke) 31 by way of a cruciform shaft 35 which constitutes the universal joint 30. A bearing 36 is arranged between the cruciform shaft 35 and the yoke.

As shown in FIG. 3, a rear end 45 of the small cylindrical portion 42 is connected to a shaft 62 by way of a constant-velocity universal joint 61, a gear 63 formed on a rear end of the shaft 62 is meshed with a gear 65 of a rear wheel shaft 64 which is rotatably supported on a rear end of the swing arm 50, and the wheel 60 is fixed to a flange portion of the rear wheel shaft 64 using bolts 66.

Accordingly, the engine 20 drives the wheel 60 by way of the output shaft 21 of the engine 20, the universal joint 30, the large cylindrical portion 41 of the drive shaft 40, the dampers 43, the small cylindrical portion 42, the constant-velocity universal joint 61, the shaft 62 and the rear wheel shaft 64.

Figure 7A:
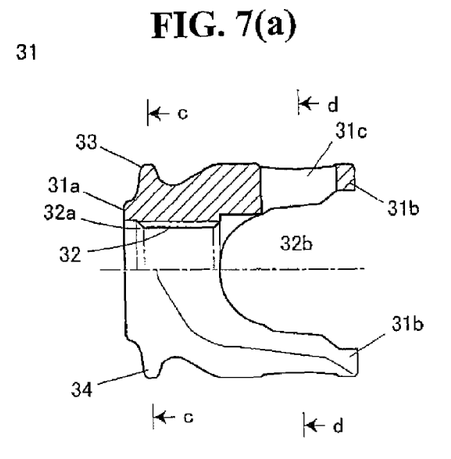
FIG. 7(a) is a plan view with a part broken away.
Figure 7B:
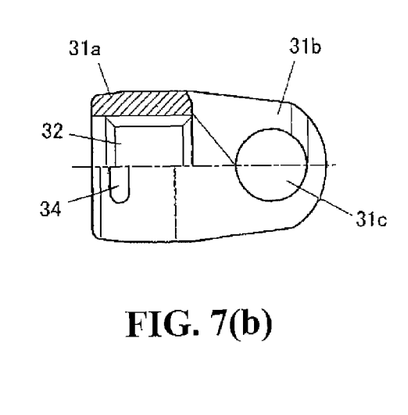
FIG. 7(b) is a side view with a part broken away of FIG. 7(a)
Figure 7C:
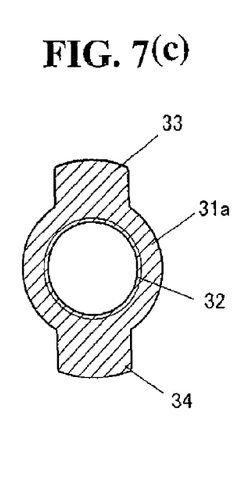
FIG. 7(c) is a cross-sectional view taken along a line c-c in FIG. 7(a)
Figure 7D:
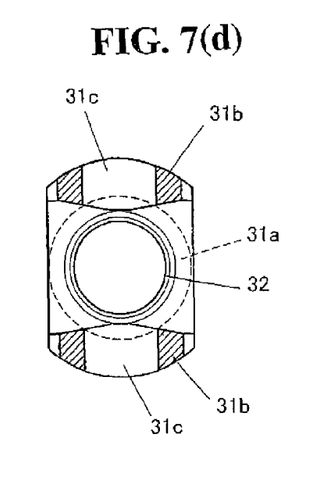
FIG. 7(d) is a cross-sectional view taken along a line d-d in FIG. 7(a)

FIGS. 7(a) to 7(d) are views showing the yoke (drive-side yoke) 31, wherein FIG. 7(a) is a plan view with a part broken away of the yoke 31, FIG. 7(b) is a side view with a part broken away of the yoke 31 shown in FIG. 7(a), FIG. 7(c) is a cross-sectional view taken along a line c-c in FIG. 7(a), and FIG. 7(d) is a cross-sectional view taken along a line d-d in FIG. 7(a).

The yoke 31 includes a cylindrical portion 31a which is connected to the output shaft 21 of the engine 20, and a pair of arm portions 31b, 31b which integrally extends rearwardly from the cylindrical portion 31a. Projecting portions 33, 34 which project outwardly (in the radial direction of the output shaft 21) are integrally formed on a front-side portion of the cylindrical portion 31a.

The spline 32 which is engaged with the spline 22 of the output shaft 21 is formed on an inner surface of the cylindrical portion 31a, and holes 31c in which end portions of the cruciform shaft 35 are fitted are formed in the arm portions 31b, 31b.

Figure 8A:
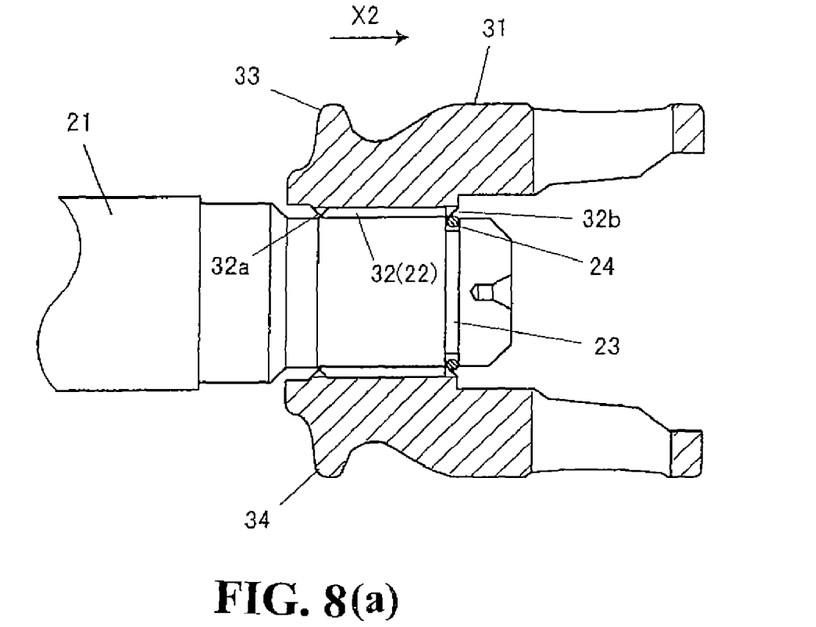
FIG. 8(a) and FIG. 8(b) are explanatory views respectively showing a state in which the yoke 31 is engaged with the output shaft 21 and a state in which the yoke 31 is disengaged with the output shaft 21.
Figure 8B:
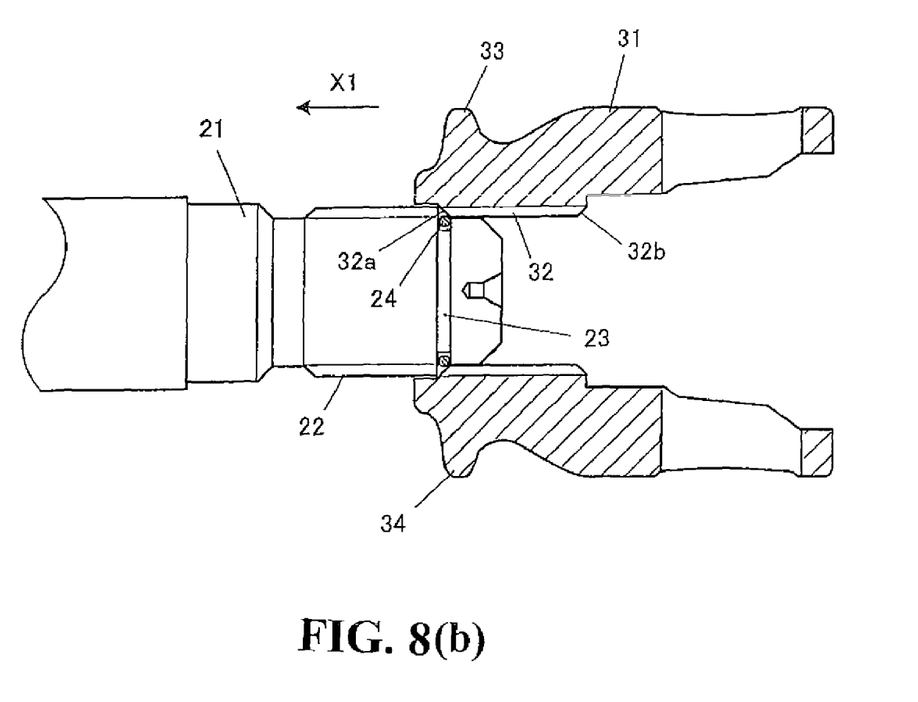

As shown in FIGS. 8(a) and 8(b), a ring-shaped groove 23 is formed in a distal end portion of the output shaft 21, and a C-ring-shaped clip 24 made of a spring material is mounted in the ring-shaped groove 23.

On the other hand, on front and rear ends of the spline portion 32 of the yoke 31, tapered portions 32a, 32b which are engaged with or disengaged from the C-ring-shaped clip 24 are formed.

Accordingly, in connecting the yoke 31 to the output shaft 21, as shown in FIG. 8(b), it is necessary for an operator to move the yoke 31 toward an output-shaft 21 side (in the direction indicated by an arrow X1) while pushing the C-ring-shaped clip 24 into the inside of the ring-shaped groove 23 at the tapered portion 32a of the yoke 31. On the other hand, in removing the yoke 31 from the output shaft 21, it is necessary for the operator to move the yoke 31 in the direction indicated by an arrow X2 while pushing the C-ring-shaped clip 24 into the inside of the ring-shaped groove 23 at the tapered portion 32b of the yoke 31 in FIG. 8(a).

As shown in FIG. 8(a), when the yoke 31 is connected to the output shaft 21, the C-ring-shaped clip 24 is expanded with a restoring force thereof and is engaged with the tapered portion 32b. Accordingly, unless the yoke 31 is moved in the direction indicated by the arrow X2 with a force sufficient to push the C-ring-shaped clip 24 into the inside of the ring-shaped groove 23 at the tapered portion 32b, the yoke 31 is held in a state that the yoke 31 is not removed from the output shaft 21.

As shown in FIG. 5, the boot 70 is a rubber boot which is constituted of an approximately cylindrical body having bellows. The boot 70 is configured such that a rear end 71 of the boot 70 is engaged with an opening end portion 51 of the main arm 53 in the swing arm 50 and a distal end portion 72 of the boot 70 is brought into close contact with the cylindrical portion 20a of an engine case around the output shaft 21. Due to such a construction, the boot 70 covers the universal joint 30 and protects the universal joint 30 from water and dusts. Further, the boot 70 prevents water and dusts from intruding into the inside of the swing arm 50.

According to the shaft drive device having the above-mentioned construction, it is possible to obtain the following manner of operation and advantageous effects.

(a) In the shaft drive device of the present invention capable of transmitting an output of the engine 20 mounted on the vehicle body 10 to the wheel 60 by way of the drive shaft 40 by connecting the drive shaft 40 to the output shaft 21 of the engine 20 by way of the universal joint 30 and by connecting the wheel 60 to the distal end side of the drive shaft 40, the projecting portions 33, 34 which project outwardly are formed on the yoke 31 of the universal joint 30 which is connected to the output shaft 21 by the splines 22, 32. Due to such a constitution, by allowing an operator to firmly grasp the yoke 31 by making use of the projecting portions 33, 34 and to apply a force to the projecting portions 33, 34, the operator can surely move the yoke 31 in the direction of the output shaft 21 of the engine.

According to an embodiment of the present invention, for example, even when an operational space provided for connecting the yoke 31 to the output shaft 21 of the engine is narrow or even when it is not desirable to slidably connect the output-side yoke of the universal joint 30 and the drive shaft 40 by spline fitting (for example, using the technique disclosed in patent document 2), the operator can easily connect the universal joint 30 to the output shaft 21 of the engine.

(b) The shaft drive device 1 of the present invention includes the boot 70 which is arranged between the end portion 51 of the swing arm 50 on the engine side and a peripheral portion 20a of the output shaft 21 in the engine 20 and covers the yoke 31 of the universal joint which is connected to the output shaft 21 by spline fitting. Thus, the intrusion of water into the shaft drive device 1 can be prevented by the boot 70.

Further, in such a shaft drive device 1 which is configured such that the boot 70 is arranged between the end portion 51 of the swing arm 50 on the engine side and the peripheral portion 20a of the output shaft 21 in the engine, and the boot 70 covers the yoke 31 of the universal joint connected to the output shaft 21 by spline fitting, in connecting the yoke 31 to the output shaft 21 of the engine, it is necessary for the operator to move the yoke 31 toward the output shaft 21 side by grasping the yoke 31 in a state wherein the boot 70 is shrunken toward the swing arm 50 side. According to the embodiment, however, by making use of the projecting portions 33, 34 which project outwardly, the operator can connect the yoke 31 to the output shaft 21 by firmly grasping the yoke 31 in a state that the boot 70 is shrunken toward the swing arm 50 side.

Figure 9:
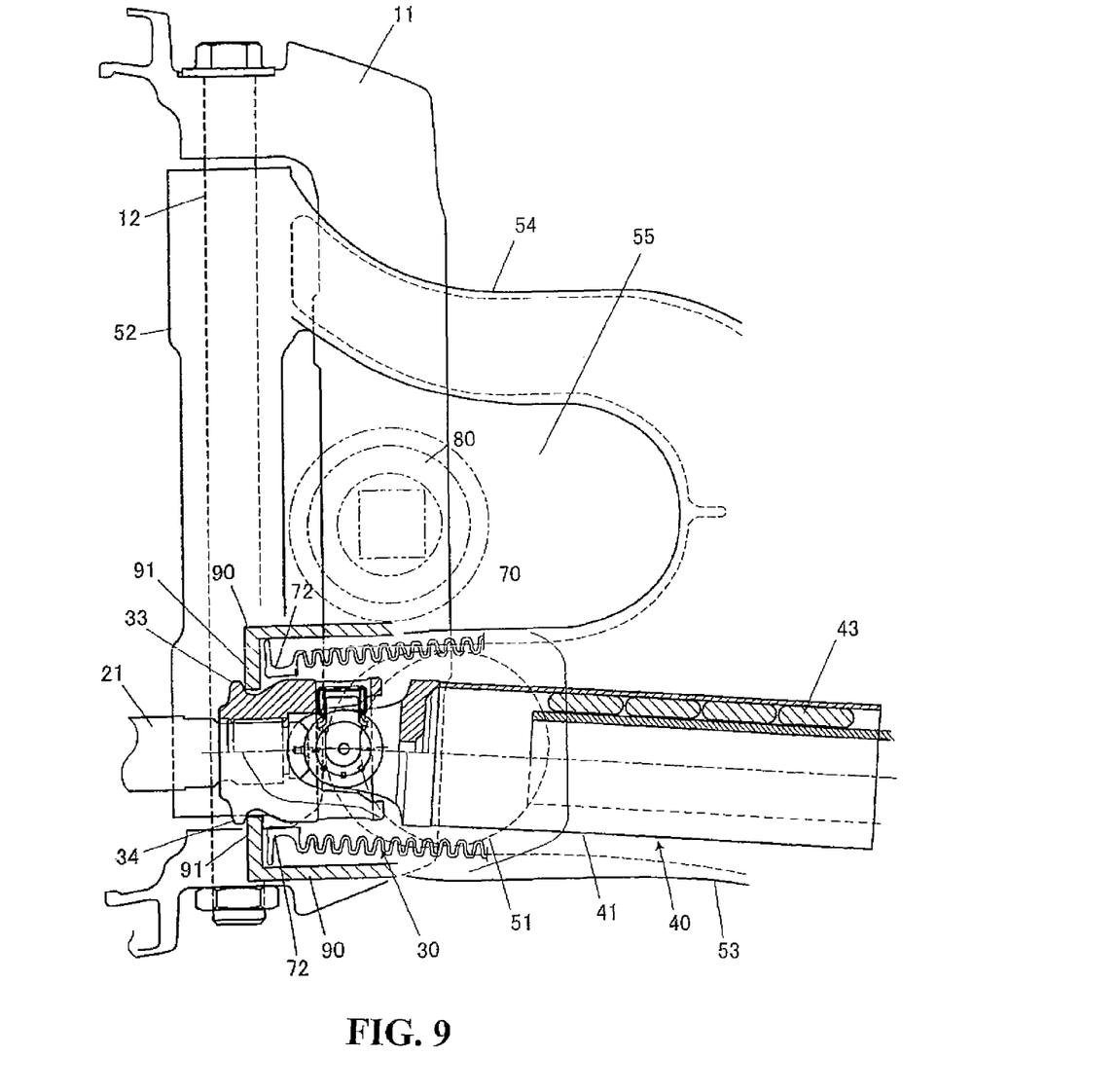
FIG. 9 is a plan view showing one example of connection operation of the yoke 31 to an output shaft 21.

The operator may manually grasp the yoke 31 or, as shown in FIG. 9, for example, the operator may grasp the yoke 31 in a state that the boot 70 is shrunken toward the swing arm 50 side using a tool 90 having a distal end 91 thereof bent inwardly to be engaged with the projecting portions 33, 34.

(c) Since the shaft drive device 1 is configured such that the swing arm 50 is rockably supported on the vehicle body 10 using one shaft (one penetration shaft) 12, it is possible to enhance the supporting rigidity of the swing arm 50 with respect to the vehicle body 10.

Further, in such a drive shaft device which is configured such that the swing arm 50 which houses the drive shaft 40 therein is supported on the vehicle body 10 using one shaft 12, the support portion (the shaft 12 and the cylindrical front portion 52 of the swing arm 50) and the universal joint 30 are made close to each other vertically. Thus, an operational space provided for grasping the yoke 31 to be connected to the output shaft 21 of the engine and for moving the yoke 31 toward the output shaft 21 side becomes narrow. According to the embodiment, however, by allowing an operator to firmly grasp the yoke 31 by making use of the projecting portions 33, 34 which project outwardly and to apply a force to the projecting portions 33, 34, the operator can surely move the yoke 31 in the direction of the output shaft 21 of the engine. Thus, the operator can easily connect the universal joint 30 to the output shaft 21 of the engine.

The operator can manually grasp the yoke 31 and can connect the yoke 31 to the output shaft 21. However, for example, as shown in FIG. 9, by allowing the operator to firmly grasp the yoke 31 using the tool 90 having the distal end 91 thereof bent inwardly to be engaged with the projecting portions 33, 34 and to apply a force to the projecting portions 33, 34 and connect the yoke 31 to the output shaft 21, the operator can easily connect the universal joint 30 to the output shaft 21 even in a narrow operational space.

(d) The ring-shaped groove 23 is formed in the distal end portion of the output shaft 21, the C-ring-shaped clip 24 is mounted in the ring-shaped groove 23, and the tapered portions 32a, 32b which are engaged with or disengaged from the C-ring-shaped clip 24 are formed on a front end and a rear end of the spline portion of the yoke 31. Thus, by engaging the tapered portion 32b formed on the rear end of the spline portion of the yoke 31 connected to the output shaft 21 with the C-ring-shaped clip 24, it is possible to prevent the removal of the yoke 31 from the output shaft 21.

When such a construction is adopted, in connecting the yoke 31 to the output shaft 21, it is necessary for the operator to move the yoke 31 in the direction of the output shaft with a force approximately sufficient to push the C-ring-shaped clip 24 into the ring-shaped groove at the tapered portion 32a of the front portion of the spline. According to the embodiment, however, by allowing the operator to firmly grasp the yoke 31 by making use of the projecting portions 33, 34 and to apply a force to the projecting portions 33, 34, the operator can surely move the yoke 31 in the direction of the output shaft of the engine. Thus, the operator can easily connect the universal joint 30 to the output shaft 21 of the engine.

(e) The driven-side yoke (44) of the universal joint 30 is integrally formed with the drive shaft 40. Thus, it is no longer necessary to connect the driven-side yoke (44) and the drive shaft 40 by spline fitting, for example.

Accordingly, it is possible to transmit a large force compared to the connection using the spline fitting.

When such a construction is adopted, the technique disclosed in the above-mentioned JP-A-2003-118675 is not applicable. According to the embodiment, however, by allowing an operator to firmly grasp the yoke 31 by making use of the projecting portions 33, 34 and to apply a force to the projecting portions 33, 34, the operator can surely move the yoke 31 in the direction of the output shaft of the engine. Thus, the operator can easily connect the universal joint 30 and the drive shaft 40 to the output shaft 21 of the engine.

Although the embodiment of the present invention has been explained heretofore, the present invention is not limited to the above-mentioned embodiment and various modifications can be made without departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shaft drive device capable of transmitting an output of an engine mounted on a vehicle body to a wheel by a drive shaft by connecting the drive shaft to an output shaft of the engine by a universal joint and by connecting the wheel to a distal end side of the drive shaft, comprising:

a projecting portion projecting outwardly, said projecting portion being formed on a yoke of the universal joint which is connected to the output shaft by spline fitting, wherein the drive shaft includes a large cylindrical portion and a small cylindrical portion, a front side of the small cylindrical portion is inserted into a rear side of the large cylindrical portion with the front side of the small cylindrical portion being connected to the rear side of the large cylindrical portion by dampers.

2. The shaft drive device according to claim 1, wherein the universal joint includes a driven-side yoke integrally formed on a front portion of the large cylindrical portion, said driven-side yoke being operatively connected to the yoke by a cruciform shaft.

3. The shaft drive device according to claim 2, and further including a bearing operatively positioned between the cruciform shaft and the yoke.

4. The shaft drive device according to claim 1, wherein a rear end of the small cylindrical portion is operatively connected to a shaft through a constant-velocity universal joint and further including a gear formed on a rear end of the shaft for meshing with a gear operatively connected to the wheel.

5. The shaft drive device according to claim 1, wherein the yoke includes a cylindrical portion operatively connected to the output shaft of the engine and a pair of arms portions integrally formed relative to the cylindrical portion and extending rearwardly therefrom, said projecting portion includes two projecting portions projecting outwardly from a front-side portion of the cylindrical portion and being formed integrally formed relative to the cylindrical portion.

6. The shaft drive device according to claim 5, wherein one of said pair of arms includes an aperture for receiving an end portion of a cruciform shaft formed on a driven-side yoke integrally formed on a front portion of a large cylindrical portion of said drive shaft.

7. The shaft drive device according to claim 1, wherein said output shaft of the engine includes a ring-shaped groove formed on a distal end portion thereof and further including a C-ring-shaped clip mounted within said ring-shaped groove for retaining said output shaft of the engine relative to the yoke.

8. The shaft drive device according to claim 1, and further including a ring-shaped groove formed on a distal end portion of the output shaft of the engine, a C-ring-shaped clip is mounted in the ring-shaped groove, and tapered portions formed on a front end and a rear end of a spline portion of the yoke for selectively engaging with or disengaged from the C-ring-shaped clip.

9. The shaft drive device according to claim 8, wherein the projecting portion formed on the yoke enables a firm grasping of the yoke for applying a force thereto for moving the yoke relative to the output shaft of the engine for connecting the universal joint relative to the output shaft of the engine.

10. A shaft drive device comprising:
an engine mounted on a vehicle body;
a drive shaft which is connected to an output shaft of the engine by way of a universal joint;
a wheel which is mounted on a distal end of a swing arm which houses the drive shaft therein and is driven by way of the drive shaft;
a boot arranged between an end portion of the swing arm on an engine side and a peripheral portion of an output shaft of the engine for covering a yoke of the universal joint, said yoke being operatively connected to the output shaft of the engine by spline fitting; and a two projecting portions formed, respectively, on opposite sides of a front-side portion the yoke and projecting outwardly therefrom, each of the two projecting portions being formed with two flat surfaces which are parallel to each other, and which project outwardly from a cylindrical part of the yoke,
wherein said yoke of the universal joint is connected to the output shaft by spline fitting.

11. A shaft drive device comprising:
an engine mounted on a vehicle body;
a drive shaft operatively connected to an output shaft of the engine by a universal joint;
a wheel mounted on a distal end of a swing arm, said swing arm housing the drive shaft therein and said drive shaft being operatively connected to rotate said wheel;
said swing arm being rockably supported on the vehicle body by a pivot shaft, said universal joint being arranged above the pivot shaft, and a projecting portion formed on a yoke of the universal joint and projecting outwardly therefrom, said yoke of the universal joint being connected to the output shaft of the engine by spline fitting.

12. The shaft drive device according to claim 11, and further including a ring-shaped groove formed on a distal end portion of the output shaft, a C-ring-shaped clip being mounted in the ring-shaped groove, and tapered portions engaging with or disengaging from the C-ring-shaped clip being respectively formed on a front end and a rear end of a spline portion of the yoke.

13. The shaft drive device according to claim 11, wherein the driven-side yoke of the universal joint is integrally formed with the drive shaft.

14. The shaft drive device according to claim 11, wherein the drive shaft includes a large cylindrical portion and a small cylindrical portion, a front side of the small cylindrical portion is inserted into a rear side of the large cylindrical portion with the front side of the small cylindrical portion being connected to the rear side of the large cylindrical portion by dampers.

15. The shaft drive device according to claim 14, wherein the universal joint includes a driven-side yoke integrally formed on a front portion of the large cylindrical portion, said driven-side yoke being operatively connected to the yoke by a cruciform shaft.

16. The shaft drive device according to claim 15, and further including a bearing operatively positioned between the cruciform shaft and the yoke.

17. The shaft drive device according to claim 13, wherein a rear end of the small cylindrical portion is operatively connected to a shaft through a constant-velocity universal joint and further including a gear formed on a rear end of the shaft for meshing with a gear operatively connected to the wheel.

18. The shaft drive device according to claim 11, wherein the yoke includes a cylindrical portion operatively connected to the output shaft of the engine and a pair of arms portions integrally formed relative to the cylindrical portion and extending rearwardly therefrom, said projecting portion includes two projecting portions projecting outwardly from a front-side portion of the cylindrical portion and being formed integrally relative to the cylindrical portion.

19. The shaft drive device according to claim 18, wherein one of said pair of arms includes an aperture for receiving an end portion of a cruciform shaft formed on a driven-side yoke integrally formed on a front portion of a large cylindrical portion of said drive shaft.

20. The shaft drive device according to claim 10, wherein a rear portion of the yoke is provided with an apertures for receiving an end portion of a cruciform shaft formed on a driven-side yoke integrally formed on a front portion of a drive shaft, and wherein the aperture and an axis extending parallel to the two flat surfaces of each of the projecting portions.

* * * * *